(12) United States Patent
Swim, Jr.

(10) Patent No.: US 6,878,069 B2
(45) Date of Patent: Apr. 12, 2005

(54) HELICAL GROOVE FASTENERS AND METHODS FOR MAKING SAME

(75) Inventor: Ollie C. Swim, Jr., Livonia, MI (US)

(73) Assignee: SPS Technologies, Inc., Jenkintown, PA (US)

( * ) Notice: Subject to any disclaimer, the term of this patent is extended or adjusted under 35 U.S.C. 154(b) by 0 days.

(21) Appl. No.: 10/454,952

(22) Filed: Jun. 5, 2003

(65) Prior Publication Data

US 2004/0245772 A1 Dec. 9, 2004

(51) Int. Cl.$^7$ ................................................. B21H 3/02
(52) U.S. Cl. ............................ 470/10; 470/66; 470/84; 470/185
(58) Field of Search ............................ 470/8, 9, 10, 11, 470/16, 57, 66, 80, 82, 84, 152, 183, 185; 72/88, 72/90

(56) References Cited

U.S. PATENT DOCUMENTS

| | | |
|---|---|---|
| 1,015,059 A | 1/1912 | Morgan |
| 1,036,825 A | 8/1912 | Garchey |
| 1,799,941 A | 4/1931 | Wulle |
| 2,037,066 A | 4/1936 | Cook et al. ................. 173/263 |
| 2,223,202 A | 11/1940 | Bergan ........................... 35/32 |
| 2,232,336 A | 2/1941 | Meersteiner ................... 85/47 |
| 2,251,201 A | 7/1941 | Purtell ............................ 10/56 |
| 2,409,638 A | 10/1946 | Lyon ............................. 151/7 |
| 2,884,038 A | 4/1959 | Overton ........................ 151/44 |
| 2,895,368 A | 7/1959 | Place et al. ....................... 85/1 |
| 2,913,031 A | 11/1959 | McKay et al. ................. 151/7 |
| 2,937,060 A | 5/1960 | LaChance ................... 308/187 |
| 3,418,012 A | 12/1968 | Torre et al. ............ 287/189.36 |
| 3,738,218 A | 6/1973 | Gutshall ......................... 85/47 |
| 3,822,902 A | 7/1974 | Maurer et al. ................ 285/94 |
| 3,835,495 A * | 9/1974 | Sygnator ....................... 470/9 |
| 4,011,192 A | 3/1977 | Lees ......................... 260/37 P |
| 4,136,416 A | 1/1979 | Thomas ...................... 10/10 R |
| 4,599,172 A | 7/1986 | Gardes ....................... 210/314 |
| 4,697,969 A | 10/1987 | Sparkes ...................... 411/387 |
| 4,712,957 A | 12/1987 | Edwards et al. ............. 411/82 |
| 4,718,802 A | 1/1988 | Rockenfeller et al. ...... 411/421 |
| 4,724,694 A * | 2/1988 | Medal ........................... 72/88 |
| 4,730,966 A | 3/1988 | Schiefer ...................... 411/55 |

(Continued)

FOREIGN PATENT DOCUMENTS

DE 41 40 936 A1 6/1993

(Continued)

OTHER PUBLICATIONS

Copy of the European Communication Search Report dated Aug. 17, 2004 (EP 04 25 3383).

Primary Examiner—Ed Tolan
(74) Attorney, Agent, or Firm—Woodcock Washburn LLP

(57) ABSTRACT

Helical groove fasteners and methods for producing the same are provided for use in systems requiring fluid passage through the fastener. In one embodiment, the fastener includes a shank, a head, a threaded portion, and at least one groove extending through at least a portion of the threaded portion. The fastener can include a single groove or multiple grooves. In certain preferred embodiments, the helix rotation angle of the groove is selected so that the shank has a continuous diameter to facilitate the thread forming process. In preferred embodiments, the fastener is cold forged and the threads are formed using a thread rolling die.

8 Claims, 9 Drawing Sheets

U.S. PATENT DOCUMENTS

| | | | |
|---|---|---|---|
| 4,770,560 A | 9/1988 | Ott | 403/296 |
| 4,842,466 A | 6/1989 | Wheeler et al. | 411/366 |
| 4,907,926 A | 3/1990 | Wing | 411/366 |
| 5,011,192 A | 4/1991 | Campo | 2285/23 |
| 5,061,132 A * | 10/1991 | Cosenza | 411/3 |
| 5,074,728 A | 12/1991 | Hsu | 411/387 |
| 5,211,551 A | 5/1993 | Uppal et al. | 418/61.3 |
| H1258 H | 12/1993 | Hindle, Jr. | 416/215 |
| 5,333,976 A | 8/1994 | Dobbrunz | 411/263 |
| 5,407,312 A | 4/1995 | Terrizzi | 411/304 |
| 5,452,977 A | 9/1995 | Terrizzi | 411/82 |
| 5,672,037 A | 9/1997 | Iwata | 411/311 |
| 5,702,445 A | 12/1997 | Brånemark | 623/11 |
| 6,102,703 A * | 8/2000 | Day | 433/174 |
| 6,193,283 B1 | 2/2001 | Pickett, Jr. et al. | 285/137.11 |
| 6,503,038 B2 | 1/2003 | McGough | 411/424 |
| 2003/0095850 A1 | 5/2003 | Nishimura et al. | 411/411 |
| 2003/0108403 A1 | 6/2003 | Scoyoc | 411/421 |
| 2004/0007871 A1 | 1/2004 | Brewer, et al. | 285/124.1 |

FOREIGN PATENT DOCUMENTS

| | | |
|---|---|---|
| EP | 0 615 800 A1 | 9/1994 |
| GB | 938 | 4/1914 |
| GB | 2 201 216 A | 8/1988 |

* cited by examiner

HELICAL GROOVE FASTENERS AND METHODS FOR MAKING SAME

FIELD OF THE INVENTION

The present invention relates generally to fasteners that allow fluid passage. In particular, the invention relates to fasteners with helical grooves that allow fluid to pass through at least a portion of the fastener.

BACKGROUND OF THE INVENTION

Fasteners that allow fluid passage are often used to connect a flexible hose firmly to a rigid member having a fluid port. In one exemplary configuration, the flexible hose is connected to a fitting within an interior volume that allows fluid to flow from the interior surface of the fitting to the hose. The interior volume of the fitting is sealed with a fastener. The top opening of the fitting is sealed by the head of the fastener and the bottom opening of the fitting is sealed by the surface of the rigid member surrounding the fluid port. Fluid can flow from the fluid port of the rigid member to the interior volume of the fitting through a passage in the fastener.

Exemplary applications for such a fastener include automotive brake lines, both at the master cylinder and brake caliper; automotive clutch, oil, fuel, and cooling lines; hydraulic and pneumatic connections in industrial vehicles and equipment; gas and liquid lines in laboratory and medical equipment; and compressed air, vacuum, water, and lubrication lines in manufacturing equipment.

A common fastener used for these application is called a "banjo bolt." A banjo bolt has an internal passage along its length that connects a port at the end of the bolt with one or more ports in the shank of the bolt. The banjo bolt requires internal axial and cross drilling to create the passage. The internal drilling can reduce the tensile strength of the fastener significantly. The drilling operation also adds expense to the production process and creates the potential for contaminants, such as metal chips and flakes, to attach to the fastener. During use, the contaminant may dislodge and cause serious damage. Metal flakes entering an automotive oil line, for example, can scratch the cylinder walls of the engine. Metal chips can also become lodged in the fluid passage and create an obstruction. An obstruction in a brake line, for example, can cause brake failure.

Another type of fastener used for fluid passage has an external linear groove along the threads. Linear grooves, however, create difficulties in the thread forming process resulting in defective thread formation and inefficient manufacturing processes. A knurl can be added to the body of the fastener to facilitate the thread forming process, however, the knurl requires an additional processing step. Additionally, the forces exerted on the knurl during the thread forming process can create metal shavings that can result in contaminants attaching to the fastener.

A need exists for alternative fluid passage fasteners that can be produced in a cost effective manner for use with existing fittings designed for banjo bolts. The fluid passage fastener should be manufactured using processes that minimize the potential for creating contaminants that can attach to the fastener.

SUMMARY OF THE INVENTION

In one aspect, the present invention provides fluid passage fasteners that can be produced in a cost effective manner. Preferred fasteners include a shank with a first end and a second end, a head proximate the first end, at least one threaded portion disposed between the first and the second end, and at least one groove extending through at least a portion of the threaded portion. The threaded portion includes at least one thread having a thread root that forms a minor diameter and a thread crest that forms a major diameter. The groove has a groove cross-sectional area and forms a helix on the shank.

In certain embodiments, the groove extends to the second end of said shank. The fastener can also include a body between the threaded portion and the head. In certain embodiments, the groove extends through at least a portion of the body.

In preferred embodiments, the helix has a helix rotation angle of between about 60 and 120 degrees. The helix can have a pitch between about two times and about six times the length of the shank.

In certain preferred embodiments, the groove includes a groove root, a first flank, a second flank, and a groove flank angle between the first flank and the second flank. The thread root can intersect the first and the second flank and the groove root can be within the minor diameter of the thread. The groove cross-sectional area of the groove can be about 2 to about 30 percent of the cross-sectional area of a circle formed by the minor diameter of the thread. In preferred embodiments, the groove flank angle is between about 70 and 110 degrees. In certain embodiments, the groove flank angle is between about 85 and 95 degrees. The groove root can include a root radius that is tangential to the first flank and the second flank. Further, the fastener can include a first crest radius that is tangential to the first flank and the thread crest, and a second crest radius that is tangential to the second flank and the thread crest.

In certain embodiments, the fastener includes a plurality of grooves extending through the shank and the threaded portion. Further, the head can include a flange.

The present invention also includes methods for manufacturing a fastener. The methods include the step of providing a blank having a shank with a first end and a second end, and a head proximate the first end of the shank. A fastener die is provided that includes a cylindrical surface and at least one helical rib with a helix rotation angle between about 60 and 120 degrees. The helical rib includes a first flank surface, a second flank surface, a rib flank angle, and a transition. In certain preferred embodiments, the fastener die includes between one and three ribs. In certain embodiments, the rib flank angle is between about 85 and 95 degrees.

A groove is formed in the blank by applying a first force to the blank along the axis of the cylindrical surface and pushing the blank into the fastener die. A second force is then applied to remove the blank from the fastener die. The second force can be a torque applied to the blank about the axis of the cylindrical surface. The second force can also include pressure applied to the second end of the shank along the axis of the cylindrical surface.

In preferred embodiments, the method includes the step of creating threads on at least a portion of the shank proximate the second end. The threads can be formed by a thread rolling process. The method can also include a heat treatment. In certain embodiments, the heat treating is performed prior to the thread rolling.

Other features of the invention are described below.

BRIEF DESCRIPTION OF THE DRAWINGS

The features and advantages of the present inventions will be more clearly understood from the following drawings that represent non-limiting examples of the inventions. The different figures represent.

DETAILED DESCRIPTION OF ILLUSTRATIVE EMBODIMENTS

Figure 1:
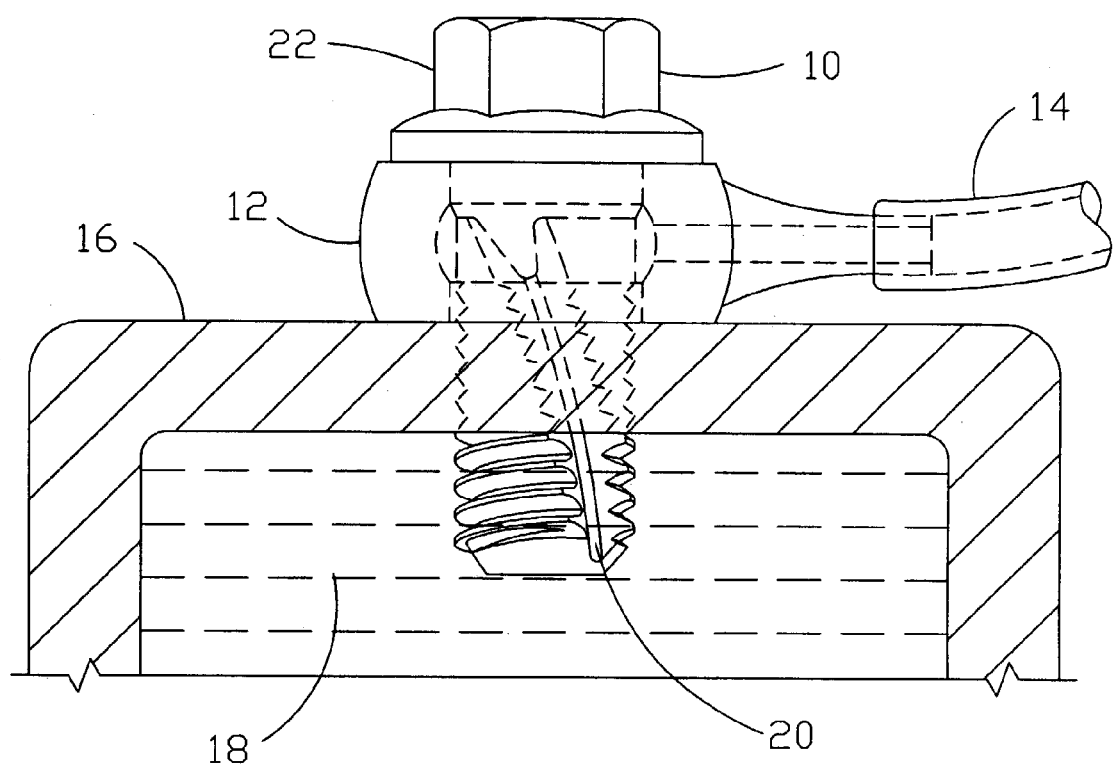
FIG. 1 shows a cross-sectional view of a system using an exemplary fastener to transfer fluid from a chamber to a fluid line.

The present invention generally provides fasteners with helical grooves for fluid passage. FIG. 1 shows a cross-sectional view of a system using an exemplary fastener 10 to transfer fluid 18 from a chamber 16 to a fluid line 14. As shown in FIG. 1, fastener 10 has a groove 20 that allows fluid 18 to pass through to the interior of fitting 12 and to fluid line 14. Groove 20 forms a helix around the axis of fastener 10. Fastener 10 includes a head 22 to seal the top opening of fitting 12. Torque applied to fastener 10 creates a seal between the head 22 and the fitting 12 and between the fitting 12 and the outer surface of the chamber 16. Washers of various materials, including metal, plastic, or rubber, can be used around fastener 10 to help seal the connection.

In certain preferred embodiments, fastener 10 is cold forged to reduce manufacturing costs. Cold forging also reduces the potential of contamination caused by chips generated in a typical machining process. The helical groove 20 facilitates the cold forging process by providing a constant diameter for the thread rolling process. The continuous contact allows the thread rolling die to straddle the groove. Unlike a linear groove that has an interrupted diameter that results in discontinuous contact with the thread rolling die, the helical groove allows the fastener to be in continuous contact with the thread rolling die.

Figure 2:
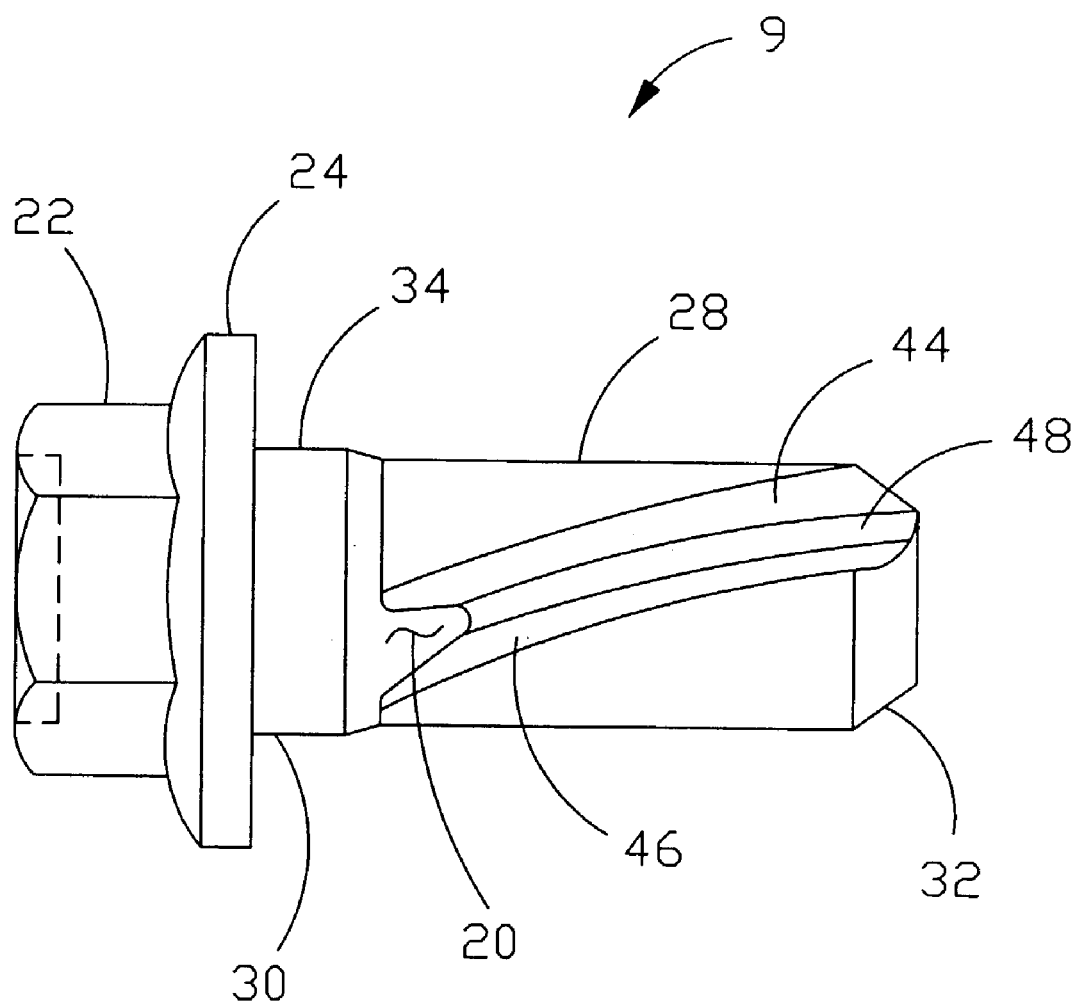
FIG. 2 shows a side view of an exemplary grooved blank.

In preferred embodiments, the groove is created on the blank before the threads are formed. FIG. 2 shows a side view of an exemplary grooved blank 9. As shown in FIG. 2, the grooved blank 9 includes a head 22 and a shank 28. Head 22 can be a hex head with flange 24 as shown, or any style known to those skilled in the art, including, for example, hex with washer, round, double hex, square, socket, and button. Shank 28 has a first end 30 and a second end 32. The head 22 is proximate the first end 30. Shank 28 also includes a body 34 and a groove 20. Groove 20 includes a first flank 44, a second flank 46, and a groove root 48.

The orientation of the groove can be characterized by its helix rotation angle. The term "helix rotation angle" is intended to refer to the total degrees of rotation that the groove would cause the fastener to turn if threaded into a nut with a complementary groove pattern. In other words, if the end of the groove 20 nearest the second end 32 is positioned at an angle that is 60 degrees from the end of the groove 20 nearest the first end 30, as measured from the axis of the fastener, the helix rotation angle would be 60 degrees. Shorter fasteners generally require a larger helix rotation angle to maintain a constant diameter for the thread rolling process. Longer fasteners can use smaller helix rotation angle.

The groove can also be characterized by its pitch. The term "pitch" is intended to refer to the linear distance, measured parallel to the axis of rotation, between any point on the groove and the corresponding point on the groove that would appear in the same axial plane and on the same side of the axis if the path of the groove was followed 360 degrees around the axis of rotation. Since the groove may not fully circle the fastener, the pitch may be greater than the length of the groove as measured along the axis of rotation. For example, if the groove has a helix rotation angle of 60 degrees and is one inch long as measured along the axis of rotation, the pitch for the groove would be six inches. In certain preferred embodiments, the pitch is between about two times and six times the length of the shank.

Figure 3:
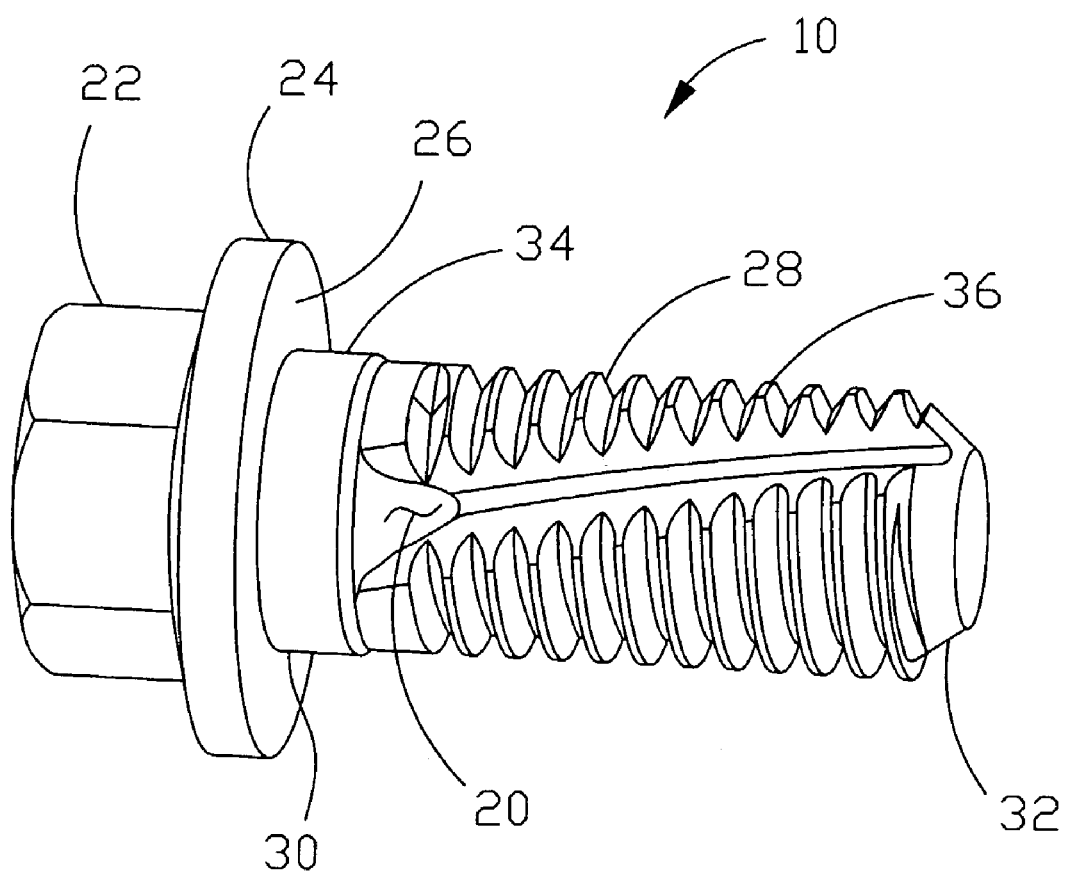
FIG. 3 shows a perspective view of an exemplary fastener with a single groove having a helix rotation angle of 60 degrees.

FIG. 3 shows a perspective view of an exemplary fastener with a single groove having a helix rotation angle of 60 degrees. As shown in FIG. 3, groove 20 extends from the second end 32 of shank 28 and through the thread 36. A body 34 is located on the first end 32 of shaft 28 between the thread 28 and the flange 26.

Figure 4:
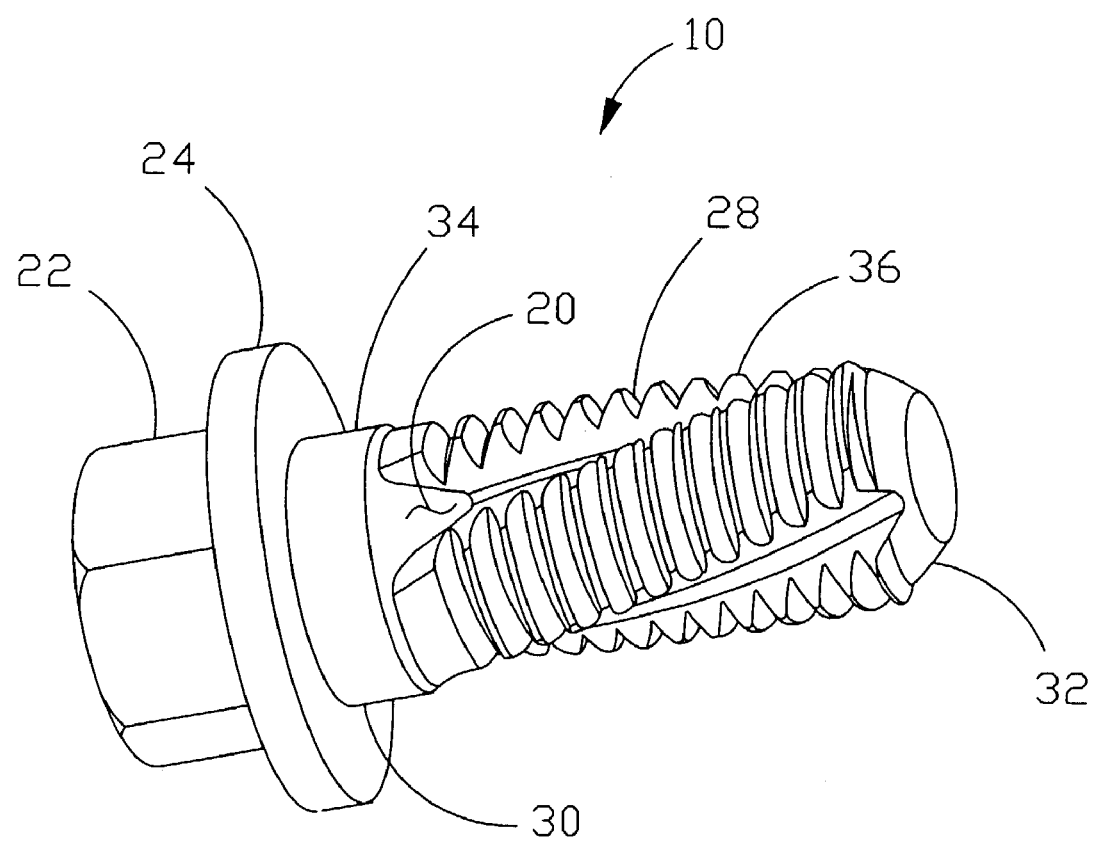
FIG. 4 shows a perspective view of an exemplary fastener with three grooves (third groove not visible) having a helix rotation angle of about 90 degrees.

In certain embodiments, more than one groove 20 can be used for fluid passage. In certain preferred embodiments, two grooves are used. Preferably the two grooves are positioned on opposites sides of the fastener. In other embodiments, three or more grooves are used. FIG. 4 shows a perspective view of an exemplary fastener 10 with three grooves 20 having a helix rotation angle of about 90 degrees. As shown in FIG. 4, the three grooves 20 are preferably located about 120 degrees from one another about the axis of rotation. The number of grooves to be used for a fastener will depend on many factors, including for example, the diameter of the fastener, the length of the fluid passage, the type of fluid, the fluid flow rate, the required tensile properties of the fastener, and the dimensions of the thread and groove.

Figure 5:
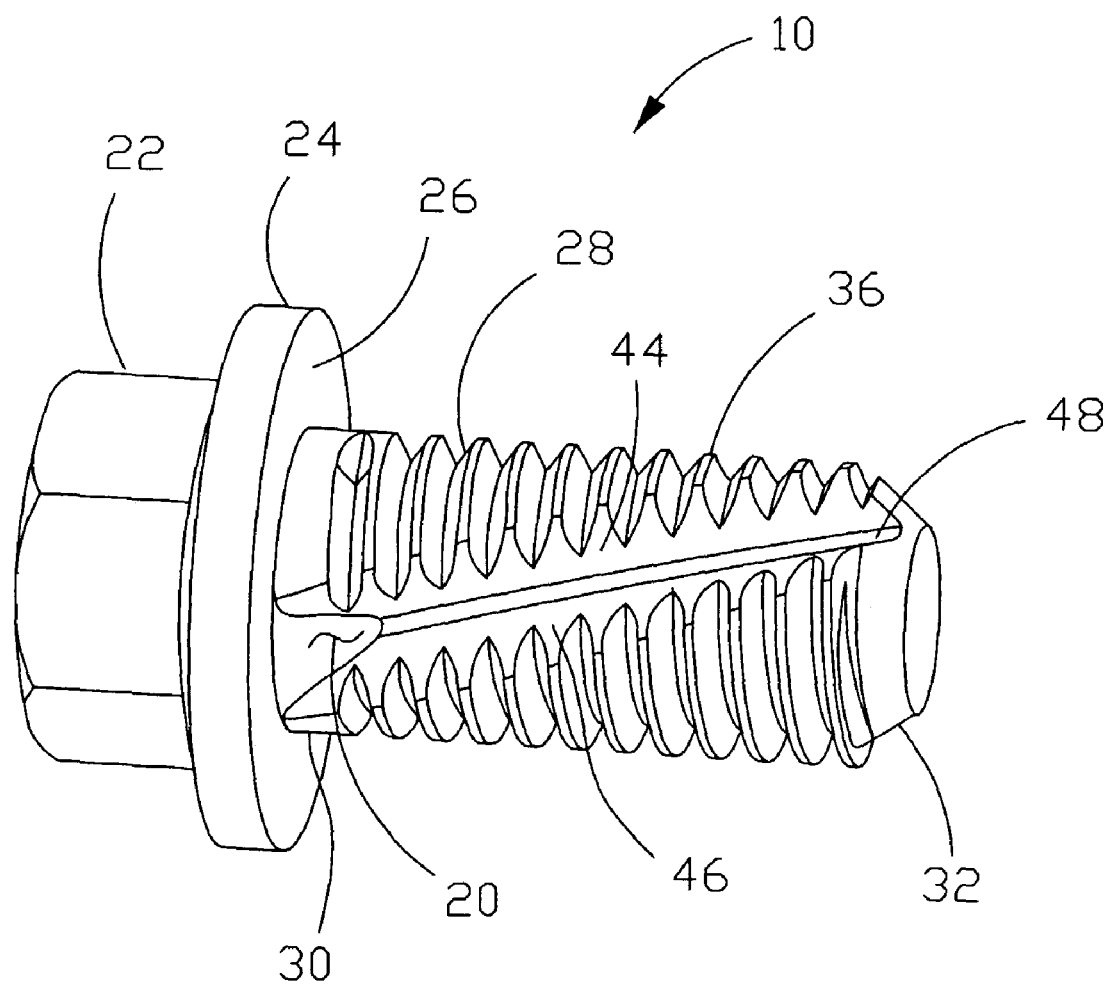
FIG. 5 shows a perspective view of an exemplary fastener without a body.
Figure 6:
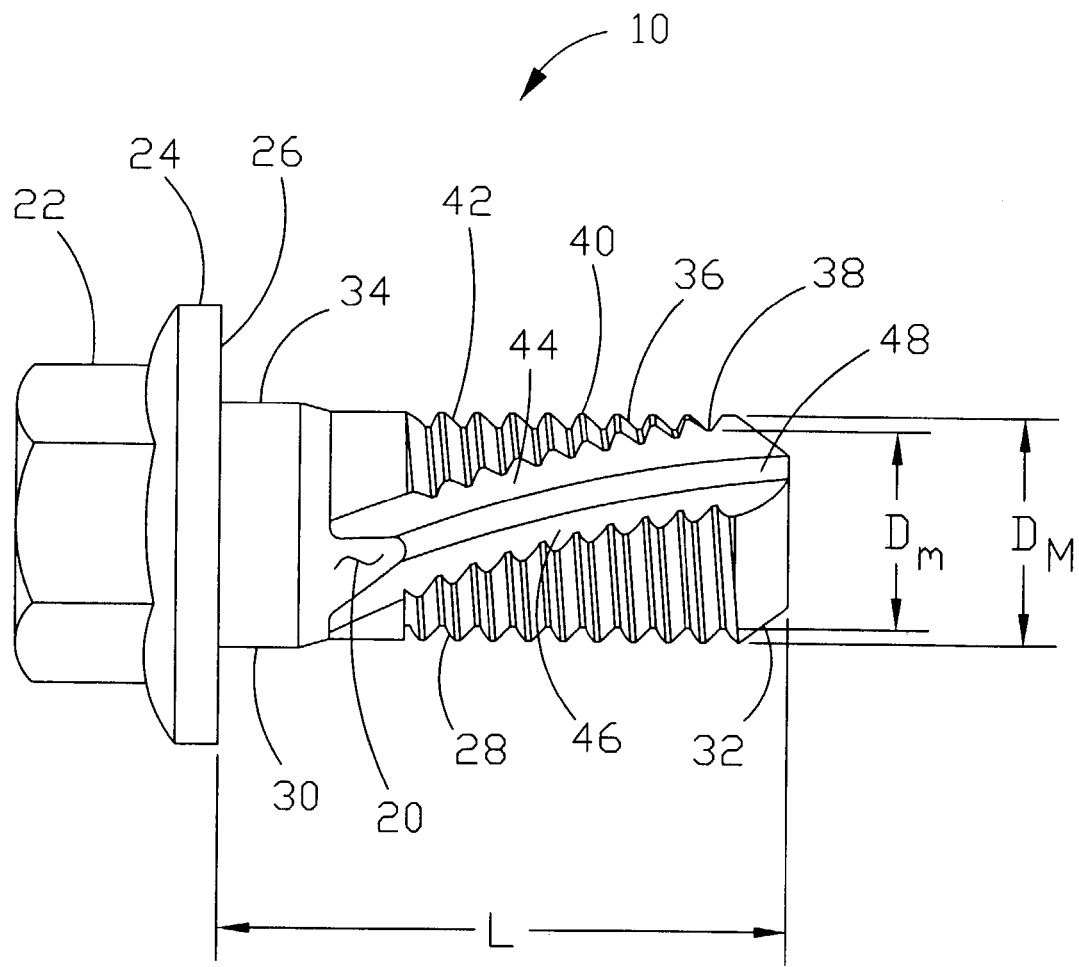
FIG. 6 shows a side view of an exemplary fastener with two grooves (one groove not visible) having a helix rotation angle of about 90 degrees.

FIG. 5 shows a perspective view of an exemplary fastener 10 without a body. As shown in FIG. 5, groove 20 of fastener 10 extends from the first end 30, through thread 36 to second end 32. The groove includes a first flank 44, a second flank 46, and a groove root 48. In certain preferred embodiments, groove root 48 is configured as a radius that is tangential to the first flank 44 and second flank 46. The radius of groove root 48 is preferably selected to optimize the groove cross-sectional area and the fatigue strength of the fastener. The term "groove cross-sectional area" is intended to refer to the cross-sectional area of the groove as measured in a plane perpendicular to the axis of rotation. The groove cross-sectional area is calculated using the perimeter formed by the first flank 44, the groove root 48, the second flank 46, and the minor thread diameter $D_m$ as shown in FIG. 6. The minor thread diameter $D_m$ is used to approximate the perimeter of the groove cross-sectional area, although the actual groove sectional-area may be larger during use if the outermost tip of the mating female thread does not extend to the thread root 38. Alternatively, groove root 48 can be flat surface, a radial surface that is not tangential to the first flank 44 or second flank 46, or a line formed by the intersection of the first flank 44 and second flank 46.

Preferably, the groove cross-sectional area is between about 1 and about 40 percent of the cross-sectional area of a circle formed by the minor diameter $D_m$. More preferably, the groove cross-sectional area is between about 2 and about 30 percent of the cross-sectional area of a circle formed by the minor diameter $D_m$. In certain preferred embodiments, the groove cross-sectional area is between about 3 and about 20 percent of the cross-sectional area of a circle formed by the minor diameter $D_m$.

FIG. 6 shows a side view of an exemplary fastener with two grooves having a helix rotation angle of about 90 degrees. As shown in FIG. 6, the threaded portion 42 of shank 28 has a minor diameter $D_m$ and a major diameter $D_M$. The minor diameter $D_m$ represents the diameter at the thread root 38. The major diameter $D_M$ represents the diameter at the thread crest 40. Also shown in FIG. 6, is length L representing the length of the shank as measured along the axis of rotation from the first end 32 to flange 26.

Figure 7:
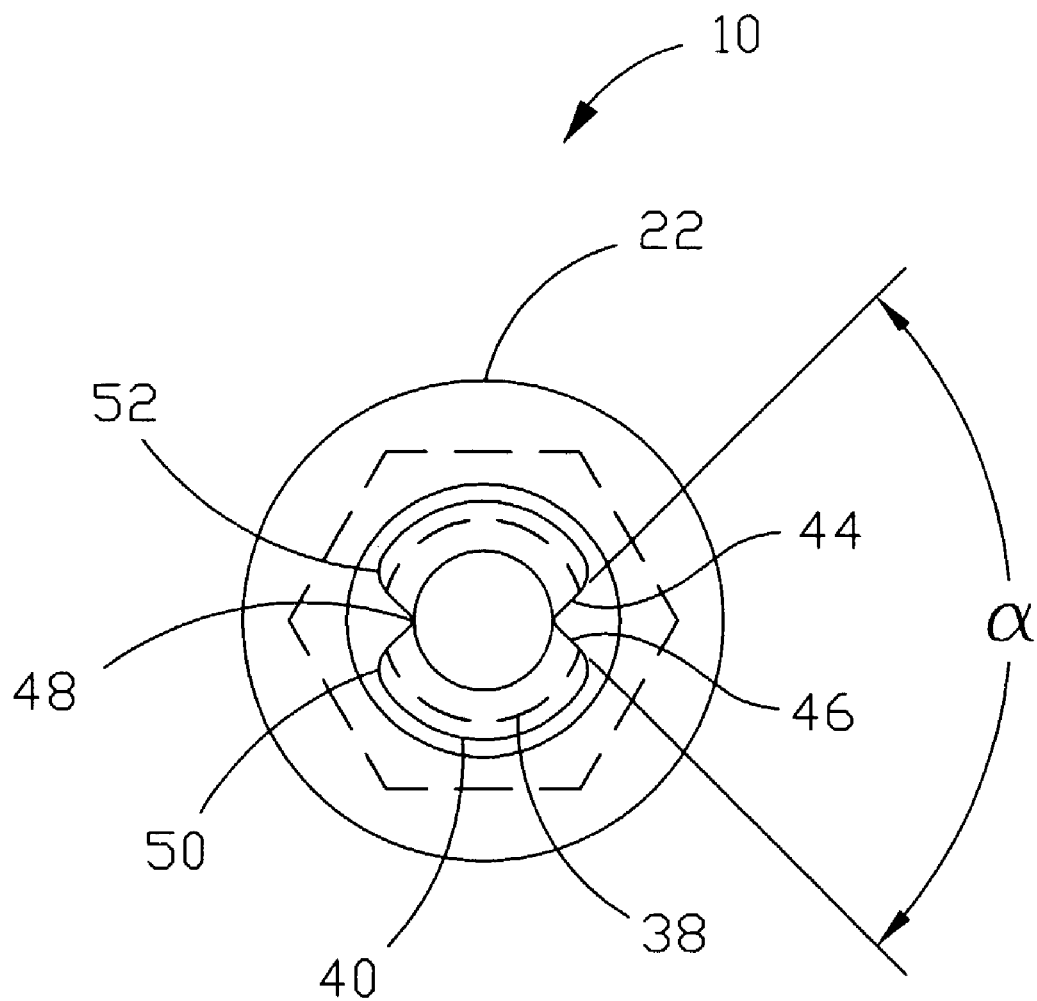
FIG. 7 shows the end view of the fastener of FIG. 6.

FIG. 7 shows the end view of the fastener of FIG. 6. As shown in FIG. 7, a first crest radius 50 is configured to be tangential to the first flank 44 and the thread crest 40. Similarly, a second crest radius 52 is configured to be tangential to the second flank 46 and the thread crest 40. Alternatively, the crest radii 50, 52 can be configured with multiple radii that create a smooth transition from the groove to the thread crest 40. In preferred embodiments, the crest radii 50, 52 are formed in the grooved blank 9 to produce a smooth transition from the open groove area to the threaded portion. A smooth transition facilitates the thread rolling process and reduces the potential of creating burrs or metal flakes that can cause contamination.

Also shown in FIG. 7 is groove flank angle α. The optimum groove flank angle α will depend on many factors, including for example, the diameter of the fastener, the length of the fluid passage, the type of fluid, the fluid flow rate, the dimensions of the thread, the number and depth of the grooves, and the required tensile properties of the fastener. Preferably, the groove flank angle is between about 60 and 120 degrees. More preferably, the groove angle is between about 75 and 105 degrees. In certain preferred embodiments, the angle is between about 85 and 95 degrees.

Figure 8:
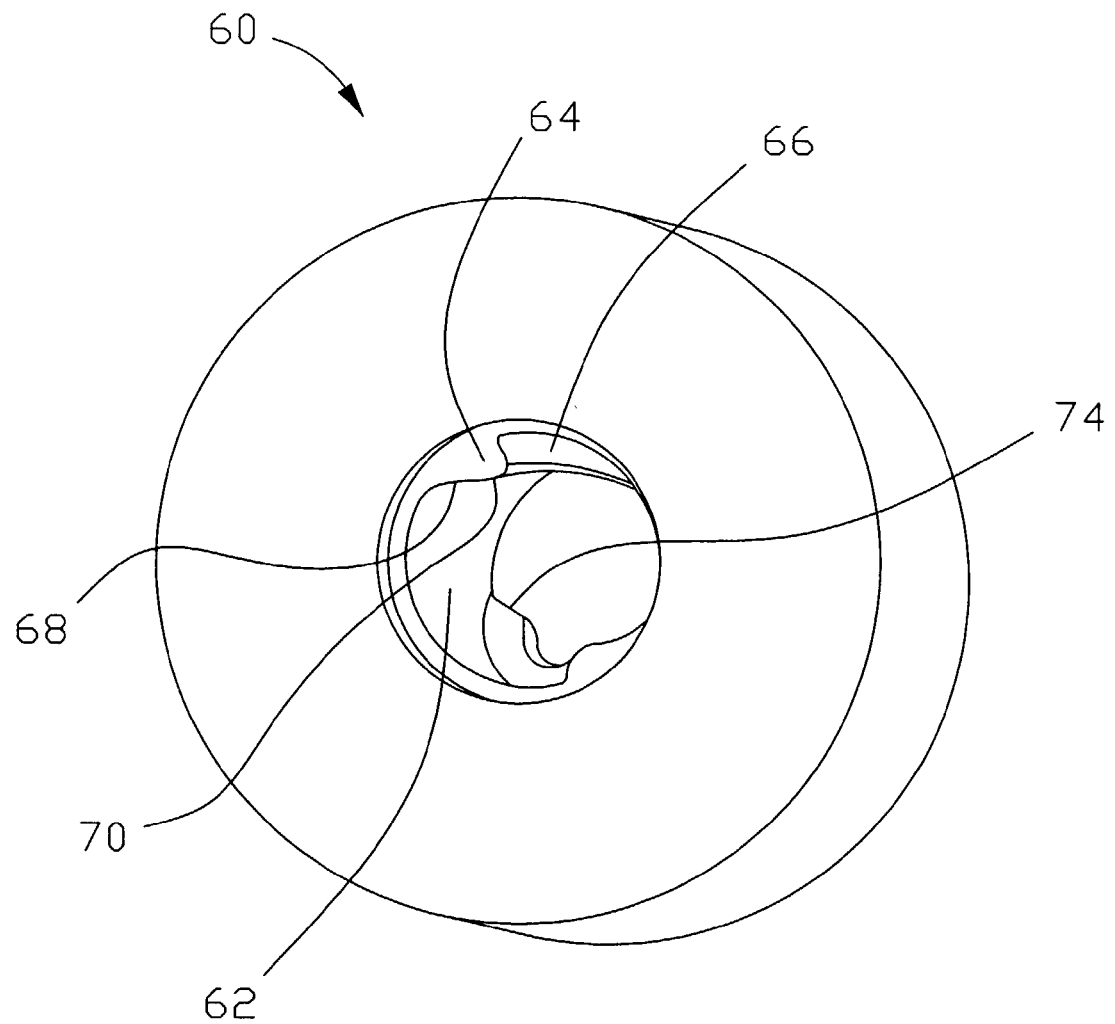
FIG. 8 shows a perspective view of an exemplary fastener die with two ribs.

FIG. 8 shows a perspective view of an exemplary fastener die 60. As shown in FIG. 8, fastener die 60 includes two ribs 64, each having a first surface 66, a second surface 68, a first end 70, and a second end 74. The ribs 64 are positioned opposite from one another on a cylinder 62.

Figure 9:
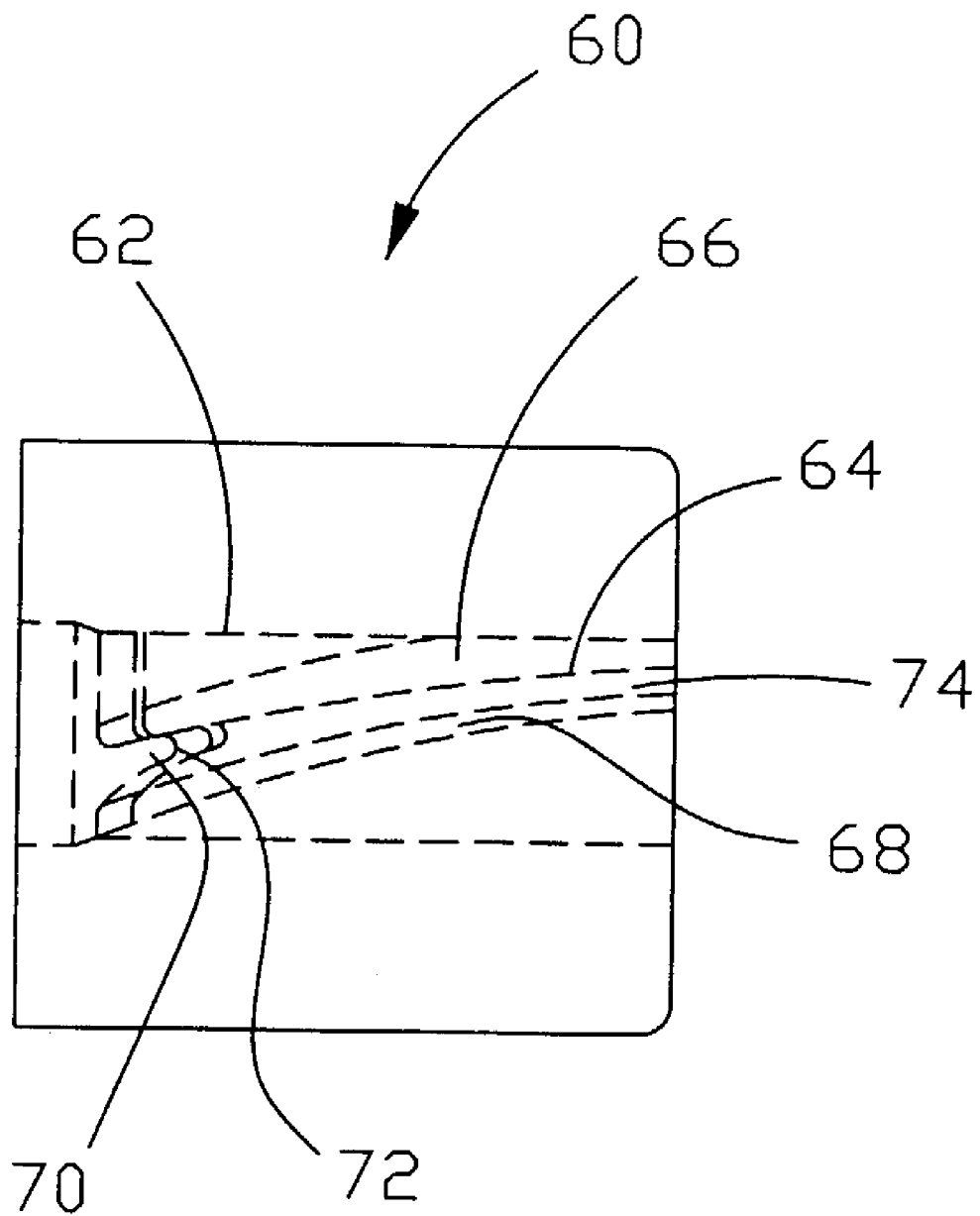
FIG. 9 shows a side view of an exemplary fastener die with one rib.

FIG. 9 shows a side view of an exemplary fastener die 60 with one rib 64. Rib 64 is positioned on cylinder 62 and has a first surface 66, a second surface 68, a first end 70, a second end 74, and a transition 72. Transition 72 is used to create a smooth transition from cylinder 62 to rib 64.

Fastener die 60 is used to create a grooved blank. In preferred embodiments, rib 64 is configured to produce a grooved blank having a helix rotation angle between about 60 and 120 degrees. Since the helix rotation angle of the grooved blank will depend on the length of the blank extruded by the die, a fastener die can be used to produce grooved blanks with various helix rotation angles. Each of the groove blanks produced by a common fastener die, however, will have a common groove pitch. Fastener die 60 can have a single rib as shown or multiple ribs.

A grooved blank can be extruded by the die by forcing a blank into the fastener die. In preferred embodiments, the blank is extruded with the head attached to the shank. The blank is forced into the die by applying a force to the head along the axis of the shank. As the blank travels through the cylinder and encounters the rib, the rib causes the second end of the shank to rotate relative to the first end of the shank. The first surface 66 of rib 64 forms the first flank 44 of groove 20. As the compressive forces caused by the first surface 66 cause the shank to twist, second surface 68 forms the second flank 46 of groove 20.

In certain preferred embodiments, the blank is forced into the fastener die until the head contacts the fastener die. Alternatively, the blank can be forced into the fastener die for less than the full length of the shank.

After extruding the blank to create a groove, the grooved blank is removed from the fastener die. In certain preferred embodiments, the grooved blank is removed by applying torque to the head. The torque is applied in a manner to "unthread" the grooved blank from the rib in the fastener die. The applied torque produces compressive forces near the second flank of the shank. Because the first flank is under greater compression relative to the second flank during entry into the fastener die, the compressive forces near the second flank during removal help produce a grooved shank with more uniform metallurgical properties, including uniform microstructure throughout the shank.

In alternative embodiments, a force is applied along the axis of the grooved blank to aid in removing the blank from the fastener die. A compressive force can be applied to the second end. Alternatively, tension can be applied to the head.

After creating a grooved blank, threads can be added to any portion of the shank using a thread rolling process. Alternatively, threads can be added by cutting or grinding. The grooved blank can also be heat treated, plated, or further processed using techniques known to those skilled in the art. In certain preferred embodiments, the grooved blank is heat treated prior to the thread rolling process.

The present invention will be further clarified by the following example that is intended to be purely exemplary of the inventions. An exemplary M10×1.5 threaded fastener has a length of 0.93 inches, a body length of 0.13 inches, a 11 mm hex head with flange, and two grooves that extended from the second end to the body. The grooves are formed using a headed blank with a shank diameter of about 0.386 inches. After extrusion in the fastener die, the shank of the grooved blank has a diameter of about 0.352 inches. The depth of the grooves are about 0.054 inches. The groove flank angle is about 90 degrees and the groove root radius is about 0.010 inches. The radius between the groove flanks and the shank diameter are about 0.045 inches. Threads are added to the grooved blank using a thread rolling process. The formed threads have a major diameter of about 0.39 inches.

It is to be understood that even in the numerous characteristics and advantages of the present inventions set forth in the foregoing description and examples, together with details of the structure and function of the inventions, the disclosure is illustrative only, and changes can be made to detail, especially in matters of shape, size, and arrangement of the grooved fastener with the principles of the inventions to the full extent indicated by the terms in which the appended claims are attached. For instance, the helical grooves can be right-handed or left-handed and can be used for any type of fluid, both liquid and gas.

What is claimed:

1. A method for manufacturing a fastener comprising the steps of:
   providing a blank comprising a shank having a first end and a second end, and a head proximate said first end of said shank;
   providing a fastener die comprising a cylindrical surface and at least one helical rib with a helix rotation angle between about 60 and 120 degrees, said helical rib comprising a first flank surface, a second flank surface, a rib flank angle, and a transition;
   forming a groove in said blank by applying a first force to said blank along the axis of said cylindrical surface and pushing said blank into said fastener die; and
   applying a second force to remove said blank from said fastener die.

2. The method of claim 1 further comprising the step of creating threads on at least a portion of said shank proximate said second end.

3. The method of claim 2 wherein said threads are formed by a thread rolling process.

4. The method of claim 3 further comprising the step of heat treating the fastener.

5. The method of claim 4 wherein said heat treating is performed prior to said thread rolling.

6. The method of claim 1 wherein said second force comprises a torque applied to said blank about the axis of said cylindrical surface.

7. The method of claim 1 wherein said second force further comprises pressure applied to said second end of said shank along the axis of said cylindrical surface.

8. The method of claim 1 wherein said fastener die comprises between one and three ribs.

* * * * *